C. DAUTHENDEY.
Apparatus for Exhibiting Photographs.
No. 146,880.          Patented Jan. 27, 1874.
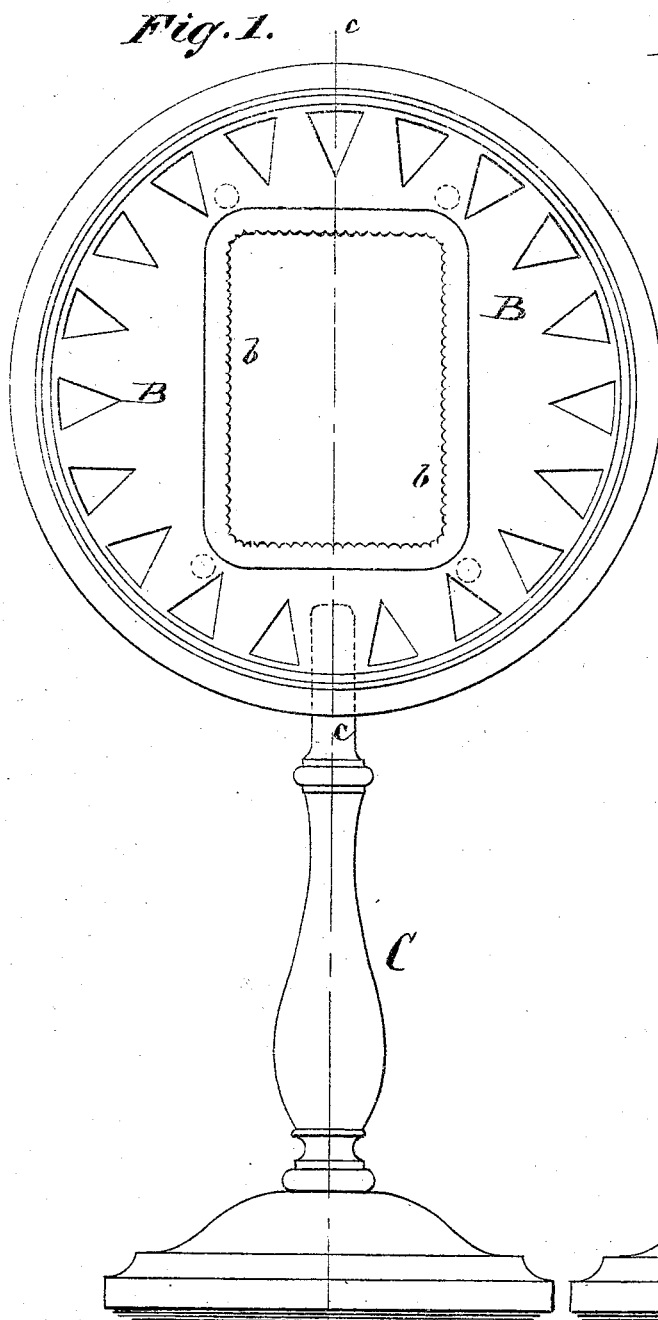
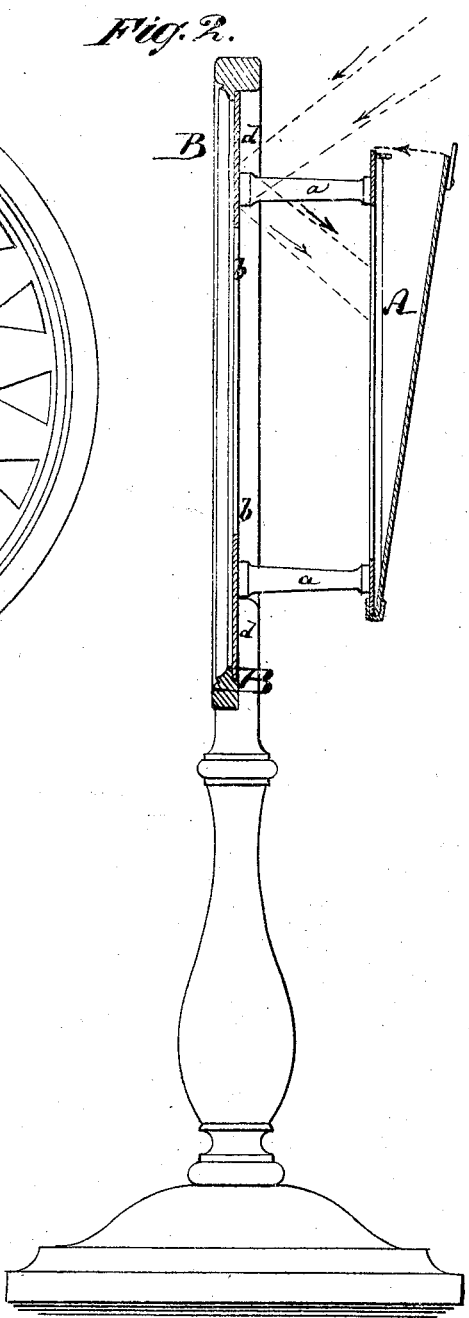

UNITED STATES PATENT OFFICE.

CARL DAUTHENDEY, OF WÜRZBURG, GERMANY.

IMPROVEMENT IN APPARATUS FOR EXHIBITING PHOTOGRAPHS.

Specification forming part of Letters Patent No. 146,880, dated January 27, 1874; application filed December 27, 1873.

*To all whom it may concern:*

Be it known that I, CARL DAUTHENDEY, of Würzburg city, in the Empire of Germany, have invented an Apparatus for Viewing or Exhibiting Photographs, of which the following is a specification:

Figure 1 is a front elevation of my improved apparatus for viewing or exhibiting photographs; Fig. 2, a vertical section thereof on the line $c\ c$, Fig. 1.

Similar letters of reference indicate corresponding parts.

The object of this invention is to produce, for the holding of photographic pictures, a frame by which a mellow light, of suitable color, may be reflected upon the pictures to make them appear translucent, and thus to obtain, from a cheap card-board photograph, as nice and pleasing an effect as can now only be observed on the more expensive class of pictures produced on porcelain, or other semi-transparent substance.

My invention consists in placing an open frame in front of and at a short distance from the picture-holder, and in covering that side of such open frame which faces the picture with light-colored paper, or other suitable coloring matter, so that from the said open frame the light will be diffused, and in part reflected, upon the photograph, giving a rich and pleasing effect. By this means the pores and other imperfections of a paper photograph will be covered, or at least made invisible, and the charm of the picture increased by the finely-blended tints reflected upon the same.

In the drawing, the letter A represents a picture holder or frame, of suitable or ordinary style, adjusted for holding and displaying through the front opening a picture placed within it. This frame or picture-holder is, by a series of horizontal arms, $a\ a$, secured to the back of a plate, B, or open frame, directly behind an opening, $b$, that is formed through or in such plate or frame, for permitting the picture in A to be seen through B. The plate B may be circular, as shown, or of other suitable form, and is or may be supported on a suitable standard, C. The back $d$ of the plate B facing the picture in A is covered with tinted paper, or otherwise tinted, either in one color or in more, according to the effect to be produced, and will, when placed to face the light, reflect the diffused tint upon the picture and produce a most beautiful effect on the same. In fact, with a judicious arrangement of tint on B, the picture will look as if made of translucent material, even though it should be made of common paper. The dotted lines in Fig. 2 indicate the course of the light toward and from the tinted back of the plate B.

I claim—

The picture-holder A, combined and connected by the arms $a$ with the open plate or frame B, the back of which is tinted to reflect diffused light upon the picture in the holder A, substantially as specified.

In testimony that I claim the foregoing I have hereunto set my hand and seal this 6th day of June, 1873.

CARL DAUTHENDEY. [L. S.]

Witnesses:
   Dr. A. POPPE,
   AUG. EMMERT.